(12) United States Patent
Baker et al.

(10) Patent No.: US 10,144,183 B2
(45) Date of Patent: Dec. 4, 2018

(54) VERIFICATION OF TOW PLACEMENT BY A ROBOT

(71) Applicant: The Boeing Company, Chicago, IL (US)

(72) Inventors: Anthony W Baker, Gilbertsville, PA (US); Steven A Dorris, Hazelwood, MO (US); Christopher P Bellavia, Hazelwood, MO (US); Hugh L Taylor, Mukilteo, WA (US); Luke C Ingram, Summerville, SC (US); Kenny P Bowers, Charleston, SC (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 15/167,681

(22) Filed: May 27, 2016

(65) Prior Publication Data

US 2017/0341314 A1    Nov. 30, 2017

(51) Int. Cl.
| | | |
|---|---|---|
| *B29C 70/38* | (2006.01) |
| *G05B 19/409* | (2006.01) |
| *B29K 105/08* | (2006.01) |
| *B29K 307/04* | (2006.01) |

(52) U.S. Cl.
CPC .......... *B29C 70/382* (2013.01); *G05B 19/409* (2013.01); *B29K 2105/08* (2013.01); *B29K 2307/04* (2013.01); *G05B 2219/39059* (2013.01); *Y10S 901/30* (2013.01)

(58) Field of Classification Search
CPC ..... B29C 70/38; B29C 70/382; B29C 37/384; B29C 70/386; B29K 2105/08; B29K 2307/04; G05B 19/409; G05B 2219/39059; Y10S 901/30
See application file for complete search history.

(56) References Cited

U.S. PATENT DOCUMENTS

2007/0173966 A1* 7/2007 Oldani .................. B29C 70/382
700/110

OTHER PUBLICATIONS

Fives, "Cincinnati Viper Fiber Placement Systems Automated Composites Processing," Fives Machining Systems, Inc., 2014 (Hebron KY).

* cited by examiner

*Primary Examiner* — George R Koch
(74) *Attorney, Agent, or Firm* — Duft & Bornsen, PC

(57) ABSTRACT

Systems and methods are provided for verifying the placement of tows by a robot. One embodiment includes a robot that includes an end effector that lays up tows, actuators that reposition the end effector, a memory storing a Numerical Control (NC) program, and a robot controller that directs the actuators to reposition the end effector based on the NC program, and instructs the end effector to lay up tows based on the NC program. The system also includes a sensor system comprising an imaging device that acquires images of the tows as the tows are laid-up, a measuring device that generates input as tows are laid-up by the end effector, and a sensor controller that receives images from the imaging device and the input from the measuring device, and updates stored data to correlate the images with instructions in the NC program, based on the input.

14 Claims, 9 Drawing Sheets

VERIFICATION OF TOW PLACEMENT BY A ROBOT

FIELD

The disclosure relates to the field of robot control, and in particular, to verifying the placement of tows of material by a robot.

BACKGROUND

Multi-layer laminates of constituent material (e.g., carbon fiber) may be formed into any of a variety of shapes for curing into a composite part. To facilitate the fabrication of composite parts, a robot such as an Automated Fiber Placement (AFP) machine may be utilized. For example, an AFP machine may lay up a layer of tows of constituent material, which are then cured. After curing has completed, another layer may be laid-up by the AFP machine. In this manner, the composite part is fabricated as a series of layers over a period of time.

The operations of an AFP machine may be directed by a Numerical Control (NC) program that dictates movements of the AFP machine as tow layup continues. An AFP machine may dispense multiple tows at once in a single course, and an AFP machine may initiate or terminate individual tows within a course in response to instructions from the NC program.

While an NC program provides instructions for laying up material for a composite part in an ideal environment, some tows dispensed by an AFP machine may be placed outside of their intended locations (e.g., offset by some small amount) during the layup process. For example, unexpected forces applied by dressing/cabling surrounding the robot, or minor imperfections in the actuators that drive the robot, may cause inaccuracies when repositioning the robot. These inaccuracies may in turn result in out of tolerance inconsistencies at the laminate as tows are placed in non-optimal locations. For a large composite part (e.g., an aircraft fuselage), it may be difficult for an operator of an AFP machine to access or otherwise view tows of material as they are laid-up. Furthermore, a manual inspection process may result in delays that are incurred each time a new layer of tows is laid-up. Hence, operators of AFP machines continue to desire enhanced systems capable of detecting and reporting inconsistencies that are outside of tolerance that occur during the layup process.

SUMMARY

Embodiments described herein utilize a sensor system that is capable of determining whether tows of material laid-up by a robot correspond with instructions in an NC program. Specifically, input indicating operations of a robot in accordance with an NC program are reviewed. Based on this input, and on measurements indicating how tows are dispensed/laid-up over a period of time, images of tows generated during the lay up process may be correlated with specific tows indicated in the NC program. This enables an operator to rapidly visually detect and inspect discrepancies/inconsistencies that occur when laying up material onto a composite part.

One embodiment is a system that includes a robot. The robot includes an end effector that lays up tows of material, actuators that reposition the end effector, a memory storing a Numerical Control (NC) program, and a robot controller that directs the actuators to reposition the end effector based on the NC program, and instructs the end effector to lay up tows based on the NC program. The system also includes a sensor system comprising an imaging device that acquires images of the tows as the tows are laid-up by the end effector, a measuring device that generates input as tows are laid-up by the end effector, and a sensor controller that receives images from the imaging device and the input from the measuring device, and updates stored data to correlate the images with instructions in the NC program, based on the input.

A further embodiment is a method. The method includes directing an end effector of a robot to lay up tows of material based on a Numerical Control (NC) program, acquiring images of the tows as the tows are laid-up by the end effector, receiving input from a measuring device as tows are laid-up by the end effector, and updating stored data to correlate the images with instructions in the NC program, based on the input.

A further embodiment is a non-transitory computer readable medium embodying programmed instructions which, when executed by a processor, are operable for performing a method. The method includes directing an end effector of a robot to lay up tows of material based on a Numerical Control (NC) program, acquiring images of the tows as the tows are laid-up by the end effector, receiving input from a measuring device as tows are laid-up by the end effector, and updating stored data to correlate the images with instructions in the NC program, based on the input.

A further embodiment is a system. The system includes an imaging device that acquires images of work performed by an end effector of a robot based on instructions in a Numerical Control (NC) program, a measuring device that measures end effector activity, and a sensor controller that receives images from the imaging device and the input from the measuring device, and updates stored data to correlate the images with instructions in the NC program, based on the input.

A further embodiment is a method. The method includes acquiring images of work performed by an end effector of a robot based on instructions in a Numerical Control (NC) program, receiving input from a measuring device indicating end effector activity, and updating stored data to correlate the images with instructions in the NC program, based on the input.

A further embodiment is a non-transitory computer readable medium embodying programmed instructions which, when executed by a processor, are operable for performing a method. The method includes acquiring images of work performed by an end effector of a robot based on instructions in a Numerical Control (NC) program, receiving input from a measuring device indicating end effector activity, and updating stored data to correlate the images with instructions in the NC program, based on the input.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
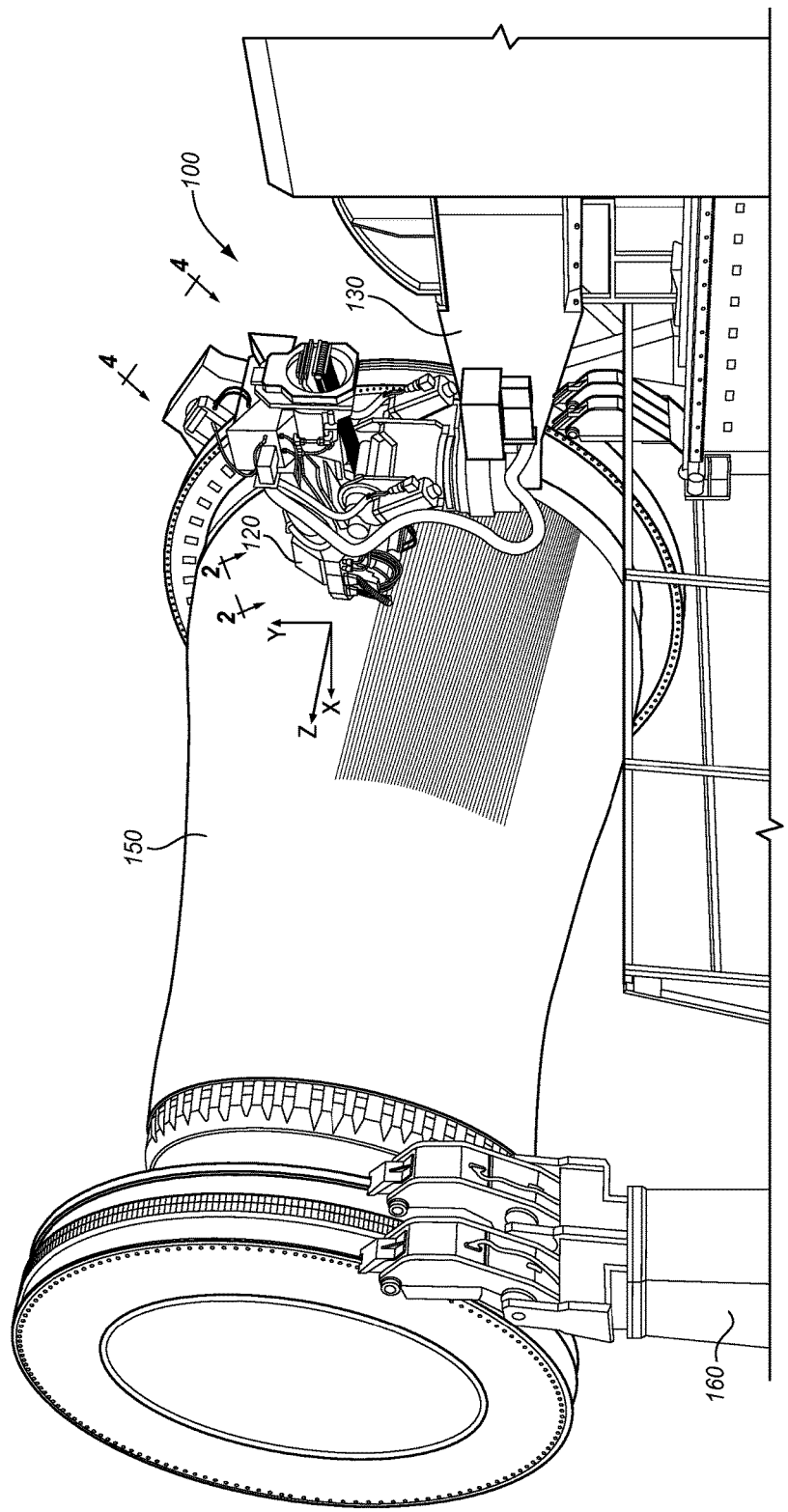
FIG. 1 is a diagram illustrating a robot that lays up tows of material in an exemplary embodiment.
Figure 2:
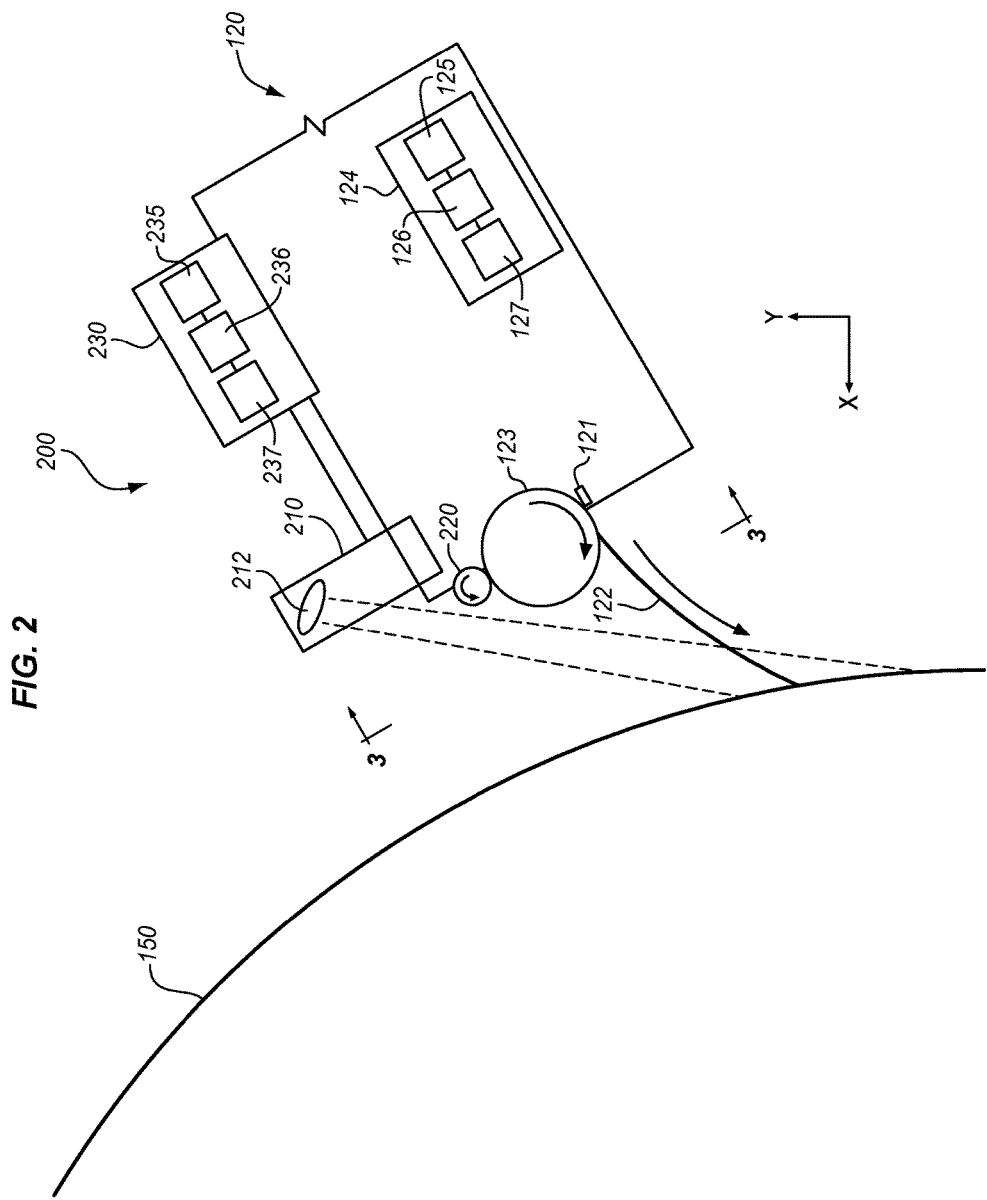
FIG. 2 is a zoomed in view of an end effector of a robot in an exemplary embodiment.

FIG. 1 is a diagram illustrating a robot 100 (e.g., an AFP machine) that is mounted to a support 130 in an exemplary embodiment. Robot 100 includes end effector 120, which dispenses one or more tows 122 of material (e.g., carbon fiber) (as shown in FIG. 2) via one or more dispensers 121 (as shown in FIG. 2). Tows 122 are laid-up to form composite part 150 (e.g., a first layer or additional layer of composite part 150), which comprises multiple layers of material that have been iteratively cured into an integral whole. In this embodiment, composite part 150 comprises a fuselage section for an aircraft, and is held in place by rotational holder 160.

As robot 100 operates to lay up tows 122 onto part 150, robot 100 may move directly towards/away from composite part 150 along axis X, vertically upwards/downwards along axis Y, and/or laterally along axis Z. As used herein, when robot 100 lays up multiple tows 122 concurrently, those tows 122 are collectively referred to as a single "course." Courses that are applied consecutively and then cured together are referred to as layers. As layers are added to composite part 150, the strength of composite part 150 is beneficially enhanced.

Laying up material for a large composite part 150 such as a section of fuselage is a time-consuming and complex process. In order to ensure that tows 122 are laid quickly and efficiently, the operations of robot 100 are controlled by an NC program. In one embodiment, the NC program provides instructions on a course-by-course basis for aligning/repositioning robot 100, and laying up tows 122 onto composite part 150. In this manner, by iteratively performing the instructions in the NC program, robot 100 fabricates part 150. However, even in the best of circumstances, robot 100 may imperfectly lay up tows by placing them in locations that are not optimal (e.g., out of tolerance). This may occur due to vibrations during operation, imperfect translation between a coordinate space of the robot and a coordinate space of composite part 150, errors in the NC program, etc. To account for this issue, a sensor system (sensor system 200, of FIG. 2) is located proximate to end effector 120 of robot 100, in order to verify that tows 122 are laid-up in their intended locations, and also to report discrepancies between planned tow lay ups and actual tow lay ups.

FIG. 2 is a zoomed in view of end effector 120 of robot 100 in an exemplary embodiment. Specifically, FIG. 2 is indicated by view arrows 2 of FIG. 1. As shown in FIG. 2, end effector 120 includes one or more dispensers 121, which dispense tows 122 of material (e.g., constituent material) onto composite part 150 in response to instructions provided by robot controller 124 in accordance with an NC program. After tows 122 are dispensed, they are pressed into place on part 150 via compaction roller 123. Robot controller 124 includes processor 125, memory 126 (e.g., a solid state flash memory storing the NC program directing robot 100), and interface (I/F) 127 (e.g., an Ethernet or Universal Serial Bus (USB) port). Robot controller 124 may be implemented, for example, as custom circuitry, as a processor executing programmed instructions, or some combination thereof.

FIG. 2 also illustrates a sensor system 200 which is attached to and/or integrated with end effector 120. In this embodiment, sensor system 200 includes imaging device 210 which includes a sensing element 212 (e.g., a Charge-Coupled Device (CCD) image sensor), measuring device 220, and sensor controller 230. Imaging device 210 generates images of tows 122 over time (e.g., periodically and on an ongoing basis) as tows 122 are laid-up and compacted by compaction roller 123. Meanwhile, measuring device 220 generates input for sensor controller 230 (e.g., indicating linear distances which compaction roller 123 rolls and/or periods of time during which compaction roller 123 is rolling). The input may, for example, measure/indicate when tows 122 are being dispensed by dispensers 121. Measuring device 220 is depicted as a wheel sensor, however in further embodiments measuring device 220 may comprise a laser or ultrasonic sensor detecting travel of a tow 122 and/or compaction roller 123, or any suitable measuring device capable of detecting a length of a tow 122 dispensed over a period of time.

Sensor controller 230 includes processor 235, memory 236 (e.g., a solid state flash memory storing instructions directing sensor system 200), and interface (I/F) 237. During operation of robot 100, processor 235 acquires images from imaging device 210 via I/F 237. The incoming images are stored in memory 236. However, images depicting laid-up tows do not in and of themselves directly correspond with tows indicated in an NC program directing robot 100. This issue results from a delay between the time that robot 100 actually starts laying up a new course, and the time that robot controller 124 reports the initiation of a new course to sensor controller 230.

To address this issue, sensor controller 230 combines input from measuring device 220 with signals from robot controller 124 in order to correlate images with specific courses and/or tows indicated in the NC program. Sensor controller 230 may be implemented, for example, as custom circuitry, as a processor executing programmed instructions, or some combination thereof. Although sensor controller 230 and robot controller 124 are both shown collocated with end effector 120 in this embodiment, in further embodiments controllers 230 and 124 may be placed in other suitable locations.

Figure 3:
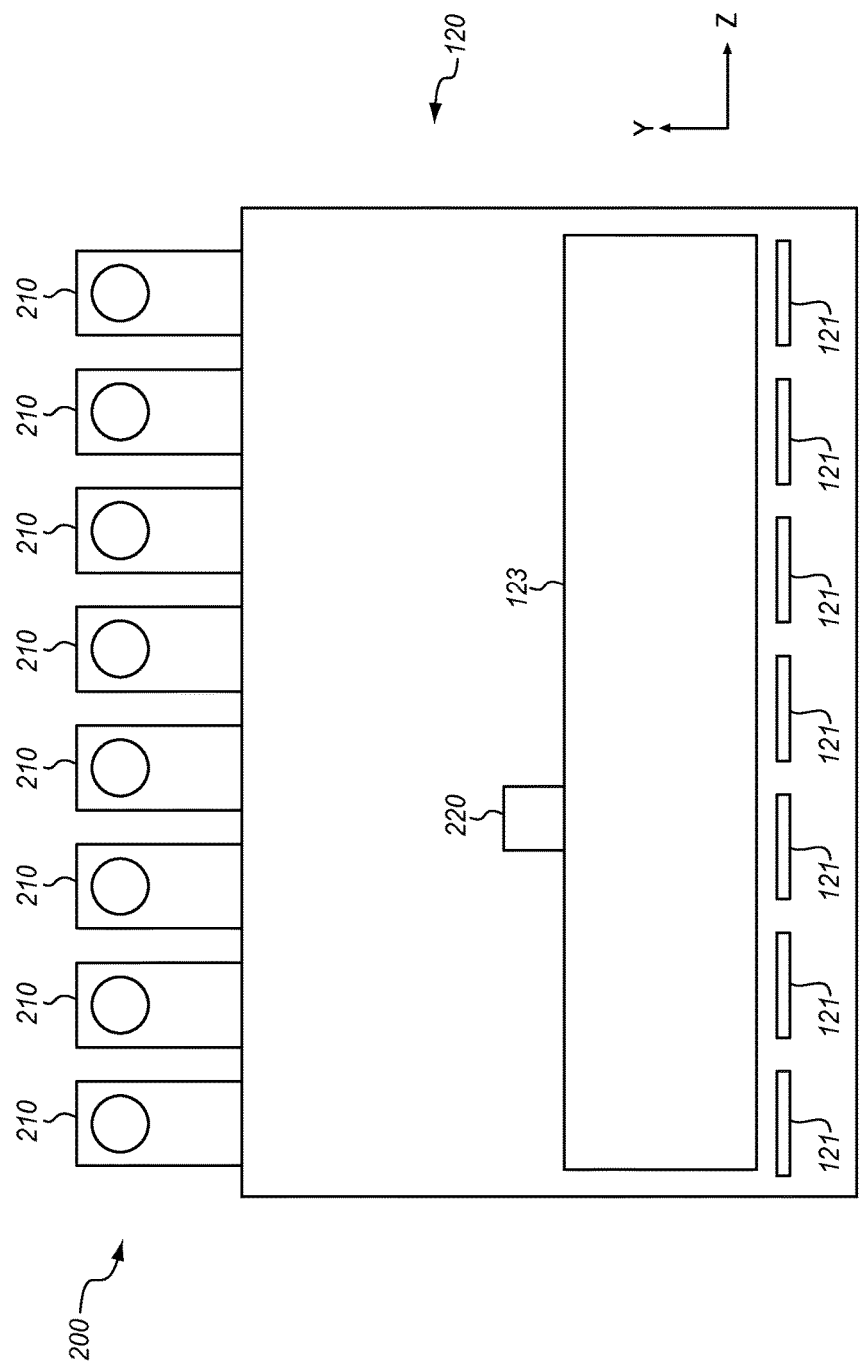
FIG. 3 is a front view of an end effector of a robot an exemplary embodiment.

FIG. 3 is a front view of end effector 120 of robot 100 an exemplary embodiment. Specifically, FIG. 3 is indicated by view arrows 3 of FIG. 2. FIG. 3 further illustrates that in this embodiment, sensor system 200 includes multiple imaging devices 210. Images from the multiple imaging devices 210 may be combined into a composite image at a single point in time by sensor controller 230. In one embodiment, sensor controller 230 correlates each imaging device 210 with a set of tow dispensers 121, by flagging images from an imaging device 210 as corresponding with specific tows 122 dispensed from a specific set of dispensers 121.

After laying up a course in accordance with an NC program, robot controller 124 may direct robot 100 to reorient and/or reposition itself based on further instructions in the NC program. In one embodiment, each instruction includes a coordinate indicating a specific orientation and/or position of robot 100. Robot controller 124 may therefore actively engage in the process of laying up new courses by operating robot 100 based on the instructions in the NC program.

Figure 4:
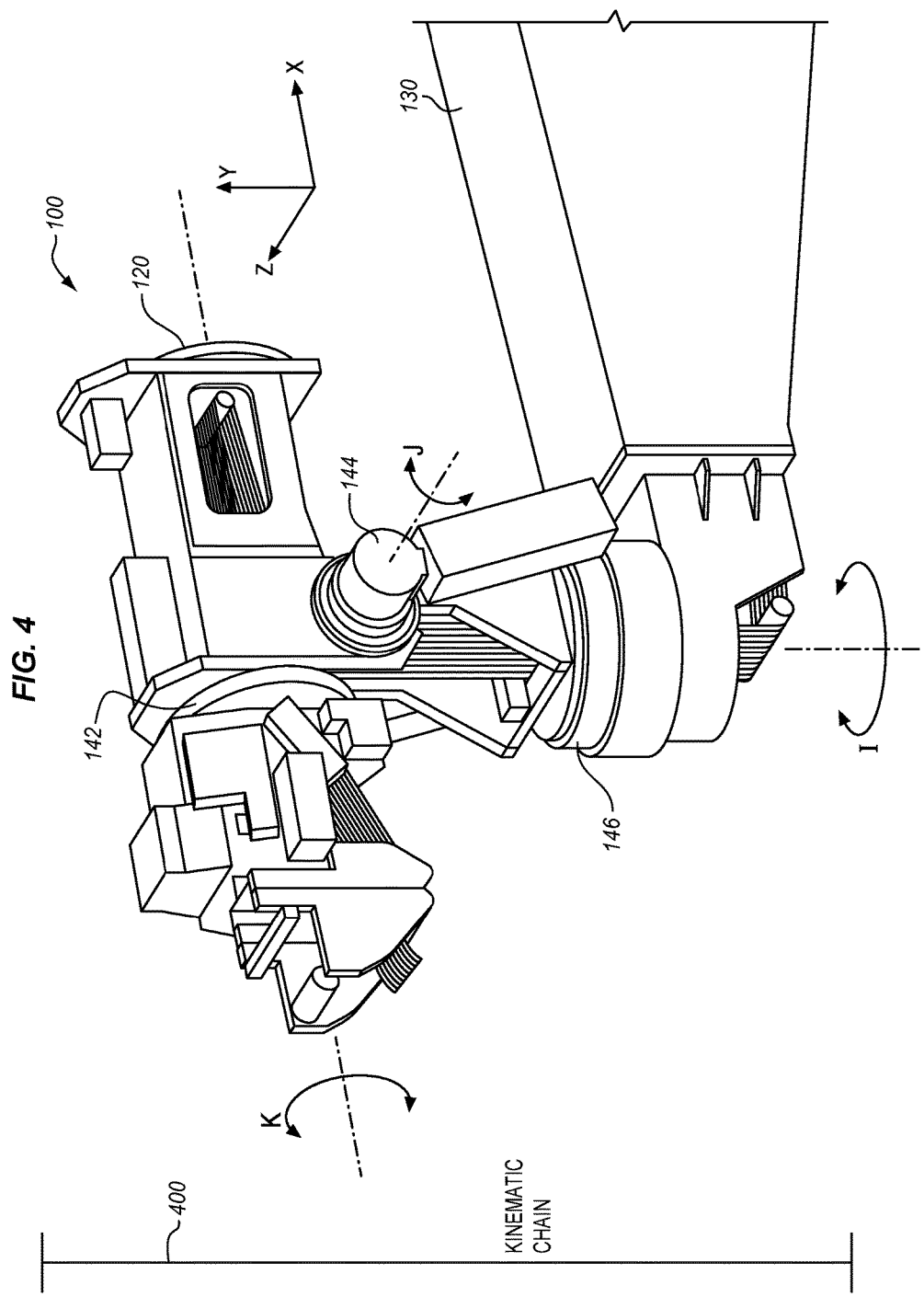
FIG. 4 is a perspective view of a kinematic chain for repositioning a robot in an exemplary embodiment.

FIG. 4 is a perspective view of a kinematic chain 400 for repositioning robot 100 in an exemplary embodiment. Specifically, FIG. 4 is indicated by view arrows 4 of FIG. 1. As shown in FIG. 4, kinematic chain 400 includes actuators 142, 144, and 146, which provide rotational control to adjust rotation (K) with respect to the X axis, rotation (J) with respect to the Z axis, and rotation (I) with respect to the Y axis respectively. Further actuators (not shown) may supplement the ability of kinematic chain 400 to translate robot 100 in an x, y, and/or z direction.

Illustrative details of the operation of robot 100 will be discussed with regard to FIG. 5. Assume, for this embodiment, that robot controller 124 has loaded instructions from an NC program in memory 126. The NC program defines multiple courses to lay up onto composite part 150. Each course is associated with a unique identifier (e.g., a course number). Furthermore, each course defines a coordinate for robot 100 according to the format (i, j, k, x, y, z). Still further, each course indicates a set of tow dispensers 121 to operate, and a distance of tow 122 to dispense from each of dispensers 121. To lay up a new course, robot 100 moves to the indicated position and orientation for that course in the NC program, and lays-up tows 122 for the course over distances indicated by the NC program.

Although courses are laid-up in accordance with the NC program, in some embodiments robot controller 124 is not directly accessible by sensor system 200. Thus, in some embodiments sensor system 200 is incapable of directly correlating specific tows/courses indicated in the NC program with images acquired over time. This issue may be amplified in scenarios where robot controller does not report the laying-up of new tows/courses in a timely manner to sensor system 200. To address these issues related to correlating images of laid-up tows with courses indicated in an NC program, method 500 is provided below.

Figure 5:
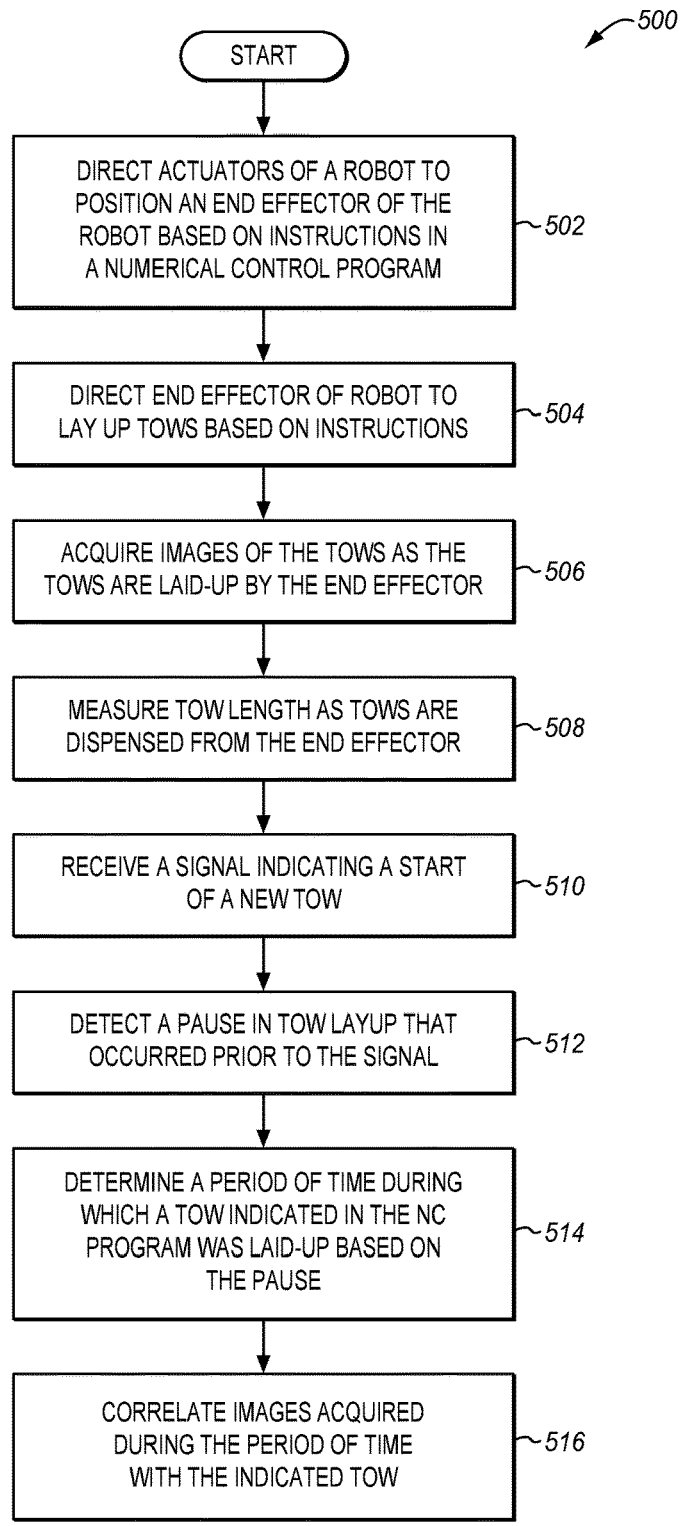
FIG. 5 is a flowchart illustrating a method for operating a sensor system to monitor layup of tows by a robot in an exemplary embodiment.

FIG. 5 is a flowchart illustrating a method 500 for operating a robot in an exemplary embodiment. The steps of method 500 are described with reference to robot 100 of FIG. 1, but those skilled in the art will appreciate that method 500 may be performed in other systems. The steps of the flowcharts described herein are not all inclusive and may include other steps not shown. The steps described herein may also be performed in an alternative order.

Processor 125 of robot controller 124 initializes by reading a first coordinate for positioning robot 100 based on the NC program in memory 126. Then robot controller 124 directs actuators (e.g., 142, 144, 146, etc.) of robot 100 to position end effector 120 based on the instructions in the NC program (step 502). This step may include identifying a current position and orientation of robot 100, and directing actuators of robot 100 to reposition robot 100 to the newly indicated coordinate in the NC program.

Robot controller 124 proceeds by directing end effector 120 of robot 100 to lay up tows 122 of material based on further instructions in the NC program (step 504), such as instructions indicating a distance over which to dispense each of multiple tows in a single course. This may further involve moving robot 100 over part 150 as tows 122 are dispensed.

During the lay up process, sensor controller 230 acquires images of tows 122 from imaging device 210 as tows 122 are laid-up by end effector 120 (step 506). However, at the point in time when an image is acquired, it is unknown what tow(s) in the NC program the acquired image relates to. This is because sensor controller 230 operates independently of robot controller 124, and therefore does not have direct, real-time access to information indicating the progress of robot 100 as the NC program is performed.

To compensate for this issue, sensor controller 230 acquires/receives input from measuring device 220 (e.g., in order to measure tow lengths) as tows 122 are laid-up by end effector 120 (step 508). In one embodiment, measuring device 220 generates a pulse signal each time a predefined length/distance of a tow 122 is dispensed from dispensers 121, or each time compaction roller 123 rotates a predefined amount. Sensor controller 230 utilizes this information from measuring device 220 in order to determine periods of time when robot 100 is actively laying up tows 122 via end effector 120. Periods of time during which layup is performed are indicated by pulse trains from measuring device 220, while periods of time during which robot 100 has paused or is repositioning are indicated by pauses between pulse trains from measuring device 220.

As tows 122 continue to be laid-up by end effector 120, robot controller 124 may provide a signal to sensor controller 230 indicating the start of a new tow 122. Sensor controller 230 receives that signal via interface 237 (step 510). However, there is a time delay between the initiation of a new course/tow by robot 100, and the transmission of a new course/tow signal from robot controller 124 to sensor controller 230. Thus, robot 100 may be already laying up new tows 122 for the new course before robot controller 124 provides the new course signal to sensor controller 230. Because of this discrepancy, sensor controller 230 engages in an analytical process to determine which images actually correspond with specific courses/tows laid-up by robot 100.

Therefore, sensor controller 230 proceeds to determine a period of time during which tows indicated in the NC program were laid-up, based on detected pause(s) (step 514). For example, to determine a period of time that corresponds with a specific course (including, for example, tows 122 for that course), sensor controller 230 reviews pulse data received from measuring device 220. Specifically, sensor controller 230 analyzes the pulse data to identify pauses in the layup process. A pause in layup at end effector 120 indicates that robot 100 has finished laying up a course (and corresponding tows 122), and is repositioning end effector 120 to a new location in order to lay up a new course. When a new course signal is detected from robot controller 124, sensor controller 230 may conclude that the course immediately prior to the one identified in the new course signal has been recently completed.

Sensor controller 230 then proceeds to determine a period of time during which tows for the prior course were laid-up. This may be determined by identifying a pause, between pulse trains from measuring device 220, that immediately precedes the latest received new course signal, identifying a pause prior to the identified pause, and determining a period of time between the two pauses. The period of time between the two pauses is the period of time in which tows for the prior course were laid-up.

After the period of time has been determined, sensor controller 230 updates stored data to correlate images with instructions in the NC program. For example, sensor controller 230 may correlate images acquired during the period of time with the tow(s) indicated in the NC program for the prior course (step 516). In this manner, when an operator selects a set of tows 122 in the NC program for review, sensor controller 230 may present images of those tows 122 to the operator via a display for review and inspection.

Performing method 500 provides a substantial benefit over prior techniques, because it enables sensor controller 230 to correlate specific images acquired by imaging device 210 with specific tows/courses indicated by the NC program directing robot 100, and does not require direct access to the NC program or to robot controller 124. Thus, when an operator of robot 100 desires to inspect tows laid-up by robot 100, they may do so based on the images acquired by imaging device 210, and without directly interfering with the fabrication process performed by robot 100.

Further techniques may be utilized in accordance with the flowchart of FIG. 5 to acquire images of work performed by an end effector of a robot based on instructions in an NC program, receive input from a measuring device indicating end effector activity, and update stored data to correlate the images with instructions in the NC program, based on the input.

Figure 6:
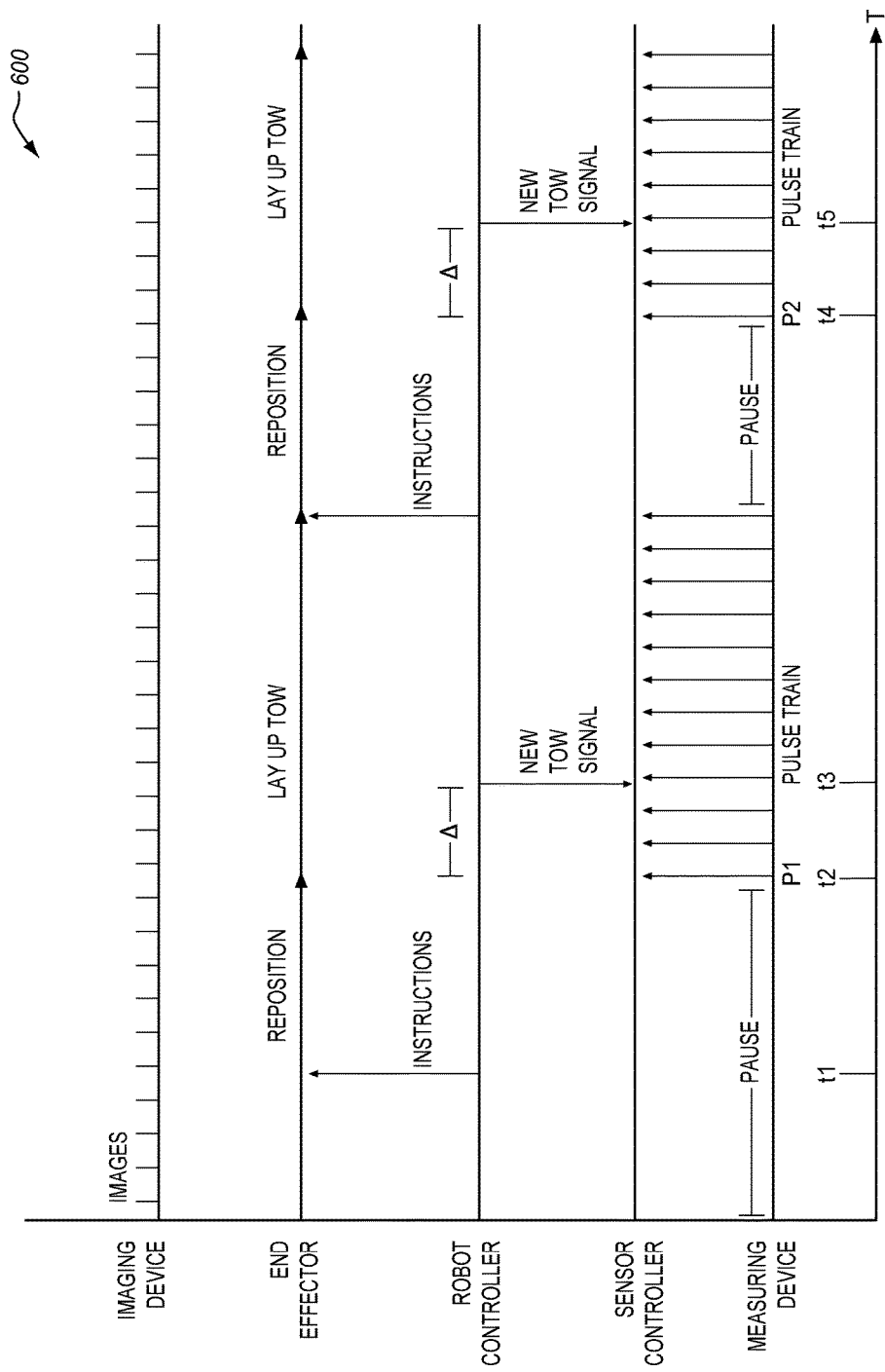
FIG. 6 is a timing diagram illustrating correlation of laid-up tows with images in an exemplary embodiment.

FIG. 6 is a timing diagram 600 illustrating correlation of laid-up tows 122 with images in an exemplary embodiment. As shown by timing diagram 600, robot controller 124 may initiate tow layup at end effector 120 by reading instructions from an NC program, and providing those instructions to actuators (e.g., 142, 144, 146, etc.) of robot 100. Robot 100 repositions end effector 120 based on the instructions provided by robot controller 124 at time t1, and then proceeds to lay up a course (e.g., comprising multiple tows) at time t2 based on the instructions. As part of laying up the course, end effector 120 dispenses tows 122 over a distance along composite part 150. As tows 122 are dispensed by dispensers 121 of end effector 120, compaction roller 123 compacts the tows 122 onto composite part 150 via rotation to complete lay-up of the tows 122. This in turn rotates measuring device 220. In this embodiment, measuring device 220 generates a pulse signal each time it rotates more than a threshold amount (e.g., thirty degrees), and consecutive pulse signals form pulse trains (P1, P2) indicating layup progress for a single course. The pulse train (P1) for the course (which initiates at time t2) does not directly correspond with the new course signal for that course, received at time t3.

At some point in time t4, a new course starts to be laid-up via end effector 120. After tows 122 have started to be laid-up by end effector 120 for the new course, robot controller 124 transmits a new tow/course signal to sensor controller 230 at time t5. The new tow/course signal indicates a number for the course currently being laid (e.g., the number of the course as defined by the NC program), and a distance over which each of the tows in the course will be laid.

Upon receiving the new course signal at time t5 from robot controller 124, sensor controller 230 proceeds to correlate the new course signal with a pulse train indicated by measuring device 220. For example, upon receiving the course/tow signal at time t5 from robot controller 124, sensor controller 230 looks back to a recent pause preceding pulse train P2. In this embodiment, a pause between pulse trains comprises any pause greater than a threshold of one second between pulses generated by measuring device 220. That is, a pause may constitute the time between two consecutive pulse signals separated in time.

Upon detecting a most recent pause (ending at time t4), sensor controller 230 proceeds to detect all pulses received between the most recent pause and a pause (ending at time t2) immediately prior to the most recent pause. The pulse train between these pauses (pulse train P1) indicates a period of time (from t2 to t4) during which tows for the signal of time t3 were laid-up. Therefore, sensor controller 230 correlates images acquired by imaging device 210 during the time period between times t2 and t4 with the course/tows indicated by the signal received at time t3. Utilizing similar techniques, each course of instructions provided by robot controller 124 may be correlated with images generated by imaging device 210, based on input from measuring device 220.

In a further embodiment, measuring device 220 may generate false signals when compaction roller 123 oscillates during the repositioning of robot 100 (e.g., signals that correspond with motions of compaction roller 123 during which tows 122 are not laid-up). To address this issue, sensor controller 230 may detect a pause by detecting a period of time during which the average time period between pulses from measuring device 220 is greater than a threshold amount. For example, if the average period of time between consecutive pulses over a length of time (e.g., ten seconds) and/or over a number of pulses (e.g., three pulses) is more than a threshold amount, this period may be considered a pause by sensor controller 230.

After sensor controller 230 has successfully correlated images with courses indicated in the NC program, sensor controller may direct a display to present a Graphical User Interface (GUI) to an operator of robot 100, in order to enable the operator to inspect composite part 150. In one embodiment, in response to receiving user input selecting a tow 122 defined in the instructions of the NC program, the sensor controller 230 displays each image correlated with the selected tow 122 as shown in FIG. 7 below.

Figure 7:
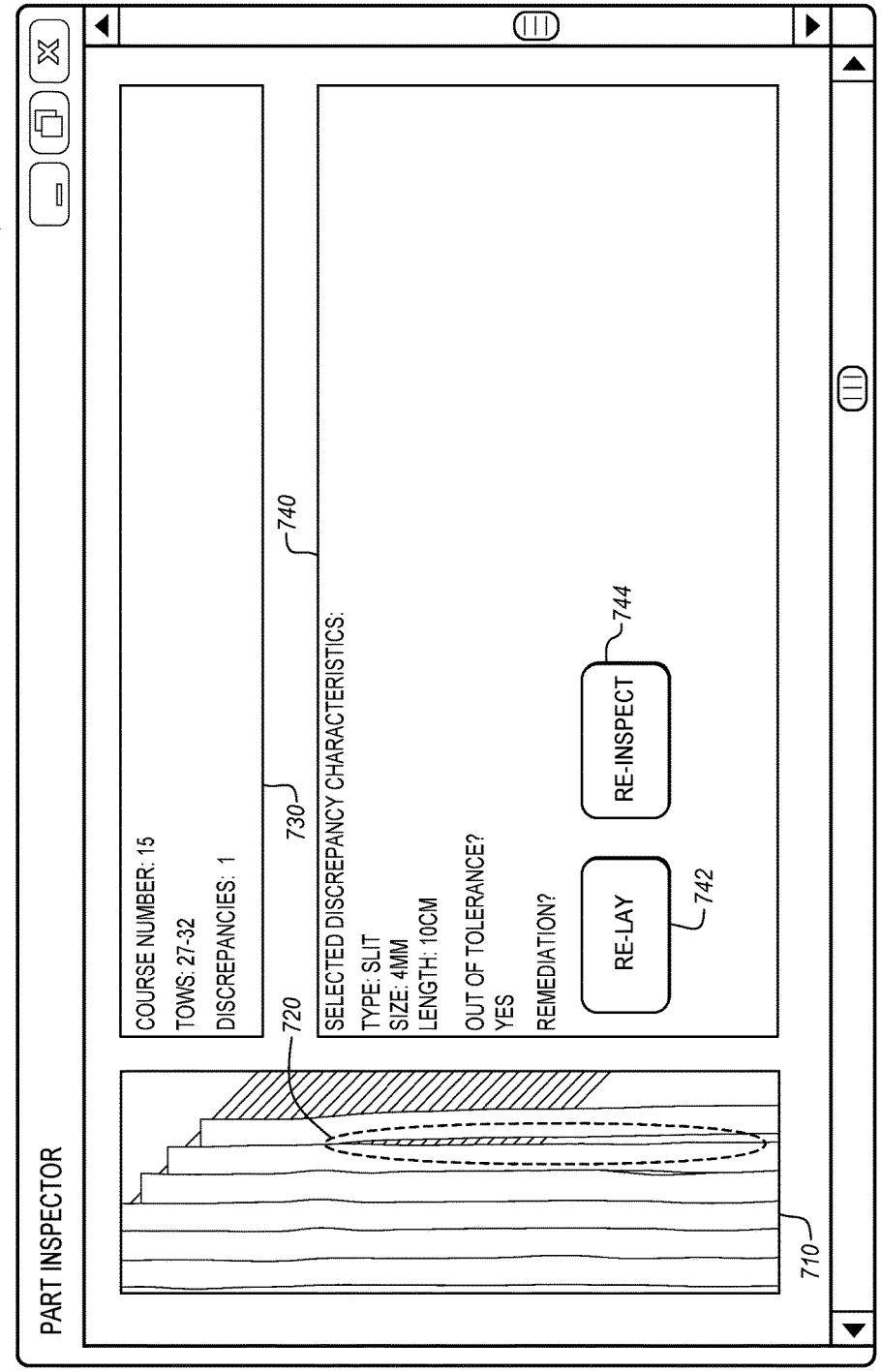
FIG. 7 is a diagram illustrating a report indicating a location of a discrepancy in an exemplary embodiment.

FIG. 7 illustrates a report indicating a location of a discrepancy in an exemplary embodiment. As shown in FIG. 7, a window 700 is a GUI (e.g., shown at a display) that presents a visual depiction 710 of a set of tows associated with a specific course/set of tows indicated by an NC program. Visual depiction 710 includes one or more images from imaging device 210, which may for example be combined into a single uniform image of a single course laid-up by end effector 120. In visual depiction 710, each tow 122 is highlighted based on edge detection algorithms (e.g., as applied by a Gaussian filter) and presented to the operator for inspection. If tows 122 do not directly correspond with their intended locations indicated in the NC program, then sensor controller 230 highlights those discrepancies in visual depiction 710, as shown by region 720 surrounding a discrepancy in visual depiction 710. FIG. 7 further includes identification display 730, which indicates the course number and tows 122 associated with visual depiction 710, as well as the number of discrepancies found within visual depiction 710. Additionally, FIG. 7 includes discrepancy information display 740, which itself includes characteristics describing the discrepancy depicted in region 720, as well as user interface elements 742 and 744 for addressing the discrepancy by pausing and/or otherwise altering the behavior of robot 100.

In further embodiments, the principles described herein are not limited to tows of constituent material for composite parts, but rather are applicable to tows of any kind (e.g., tows of tape, fabric, etc.), and further may be applied to inspect the progress of any robot adding any kind of material in a series of linear stripes.

EXAMPLES

In the following examples, additional processes, systems, and methods are described in the context of a robot that performs Automated Fiber Placement (AFP) techniques in an exemplary embodiment.

Figure 8:
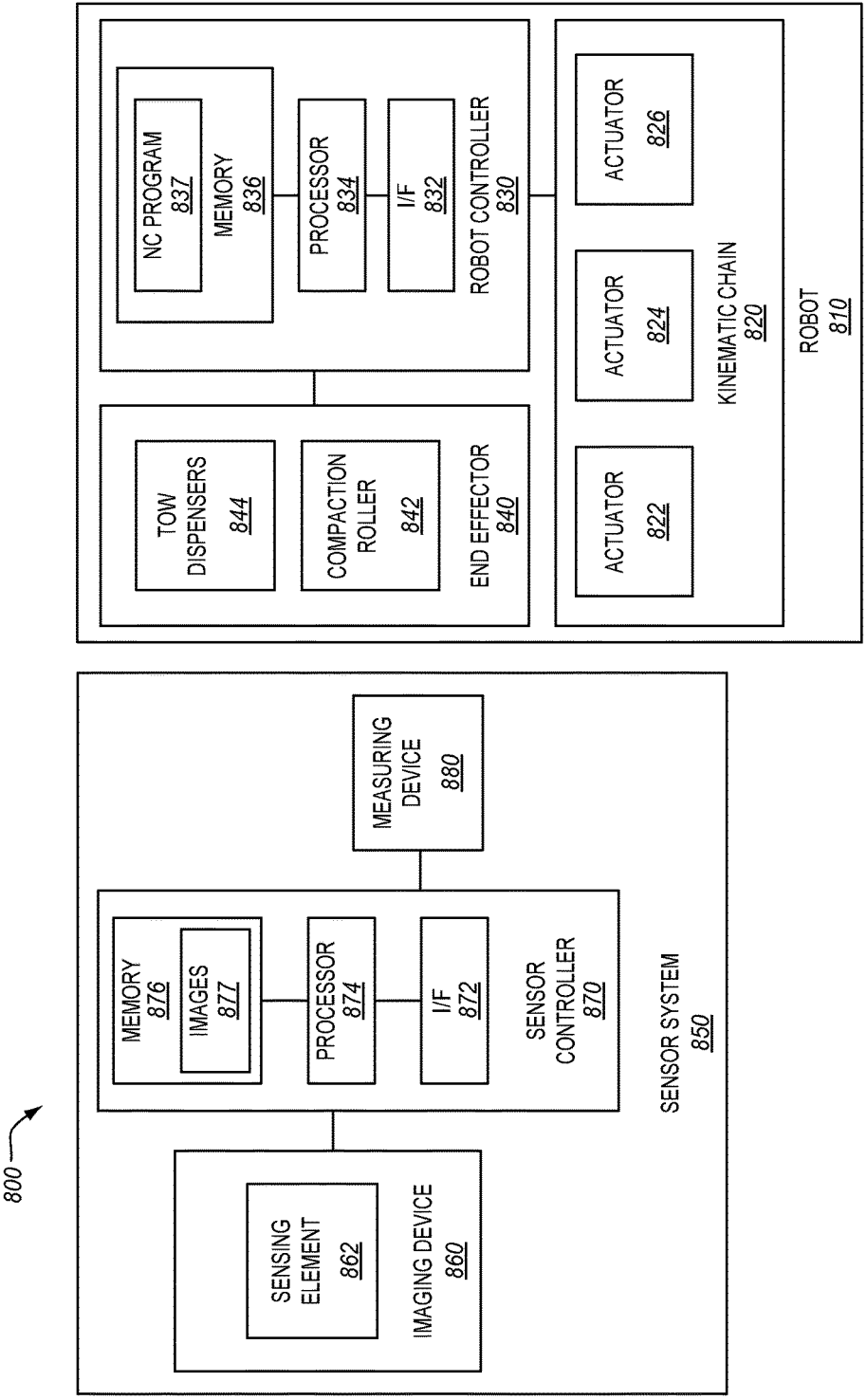
FIG. 8 is a block diagram illustrating a robot and a sensor system in an exemplary embodiment.

FIG. 8 is a block diagram illustrating a robot 810 and a sensor system 850 in an exemplary embodiment. As shown in FIG. 8, robot 810 includes kinematic chain 820, which itself includes multiple actuators 822, 824, and 826 that are operable to translate and/or rotate end effector 840 based on instructions from robot controller 830. Robot controller 830 includes I/F 832 (e.g., an Ethernet or Universal Serial Bus (USB) interface), processor 834, and memory 836. Memory 836 stores NC program 837, which indicates positions at which to lay up tows of material, as well as distances over which end effector 840 is intended to place the tows of material. As shown in FIG. 8, end effector 840 itself includes tow dispensers 844 for dispensing tows onto a composite part, as well as compaction roller 842, which is operable to apply pressure to laid-up tows in order to press those tows into place, thereby compacting the tows as a part of consolidating the laminate FIG. 8 further illustrates sensor system 850, which includes imaging device 860 (e.g., a camera, laser, or ultrasonic distancing device), sensor controller 870, and measuring device 880. Imaging device 860 includes sensing element 862 (e.g., a CCD sensor), while sensor controller 870 includes I/F 872, processor 874, and memory 876. Memory 876 stores images 877 acquired by sensor controller 870 from imaging device 860.

Figure 9:
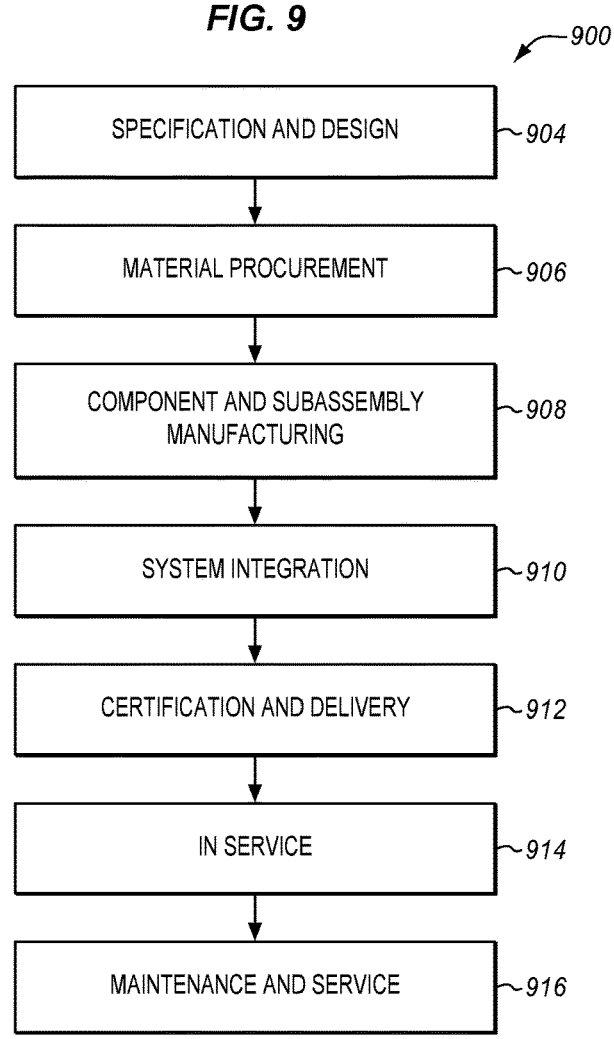
FIG. 9 is a flow diagram of aircraft production and service methodology in an exemplary embodiment.
Figure 10:
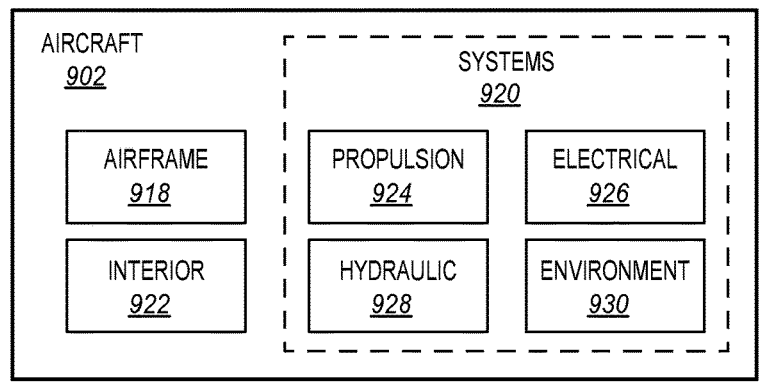
FIG. 10 is a block diagram of an aircraft in an exemplary embodiment.

Referring more particularly to the drawings, embodiments of the disclosure may be described in the context of an aircraft manufacturing and service method 900 as shown in FIG. 9 and an aircraft 902 as shown in FIG. 10. During pre-production, exemplary method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by exemplary method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

Apparatus and methods embodied herein may be employed during any one or more of the stages of the production and service method 900. For example, components or subassemblies corresponding to production stage 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916. For example, the techniques and systems described herein may be used for steps 906, 908, 910, 914, and/or 916, and/or may be used for airframe 918 and/or interior 922. These techniques and systems may even be utilized for systems 920, including for example propulsion 924, electrical 926, hydraulic 928, and/or environmental 930.

In one embodiment, robot 100 participates in fabrication of one or more portions of an airframe, and performs the fabrication during component and subassembly manufacturing 1108. The portions of the airframe may then be assembled into an aircraft in system integration 1110, and then be utilized in service 1114 until wear renders portions of the airframe unusable. Then, in maintenance and service 1116, one or more portions of the airframe may be discarded and replaced with newly fabricated composite parts created by robot 100.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
  directing an end effector of a robot to lay up tows of material based on a Numerical Control (NC) program;
  acquiring images of the tows as the tows are laid-up by the end effector;
  receiving input from a measuring device as tows are laid-up by the end effector;
  detecting a pause by identifying a set of consecutive pulse signals in the input that are separated in time by an average period that is greater than a threshold; and
  updating stored data to correlate the images with instructions in the NC program, based on the detected pause.

2. The method of claim 1 further comprising:
  receiving a signal indicating a start of a new tow;
  reviewing the input from the measuring device to detect a pause in tow layup that occurred prior to the signal;
  determining a period of time during which a tow indicated in the NC program was laid-up based on the pause; and
  updating stored data to correlate images acquired during the period of time with the tow.

3. The method of claim 2 wherein:
  the input comprises pulse signals that are generated each time a predefined length of tow is dispensed by the end effector.

4. The method of claim 1 wherein:
  the threshold is one second.

5. The method of claim 1 further comprising:
  directing the end effector to lay up multiple tows concurrently.

6. The method of claim 1 further comprising:
  in response to receiving user input selecting a tow defined the NC program, displaying each image correlated with the selected tow.

7. A non-transitory computer readable medium embodying programmed instructions which, when executed by a processor, are operable for performing a method comprising:
  directing an end effector of a robot to lay up tows of material based on a Numerical Control (NC) program;
  acquiring images of the tows as the tows are laid-up by the end effector;
  receiving input from a measuring device as tows are laid-up by the end effector;
  detecting a pause by identifying a set of consecutive pulse signals in the input that are separated in time by an average period that is greater than a threshold; and
  updating stored data to correlate the images with instructions in the NC program, based on the detected pause.

8. The medium of claim 7 wherein the method further comprises:
  receiving a signal indicating a start of a new tow;
  reviewing the input from the measuring device to detect a pause in tow layup that occurred prior to the signal;
  determining a period of time during which a tow indicated in the NC program was laid-up based on the pause; and
  updating stored data to correlate images acquired during the period of time with the tow.

9. The medium of claim 8 wherein:
  the input comprises pulse signals that are generated each time a predefined length of tow is dispensed by the end effector.

10. The medium of claim 7 wherein:
  the threshold is one second.

11. The medium of claim 7 wherein the method further comprises:
  directing the end effector to lay up multiple tows concurrently.

12. The medium of claim 7 wherein the method further comprises:
  in response to receiving user input selecting a tow defined in the NC program, displaying each image correlated with the selected tow.

13. A method comprising:
  acquiring images of work performed by an end effector of a robot based on instructions in a Numerical Control (NC) program;
  receiving input from a measuring device indicating end effector activity;
  detecting a pause by identifying a set of consecutive pulse signals in the input that are separated in time by an average period that is greater than a threshold; and
  updating stored data to correlate the images with instructions in the NC program, based on the detected pause.

14. A non-transitory computer readable medium embodying programmed instructions which, when executed by a processor, are operable for performing a method comprising:
  acquiring images of work performed by an end effector of a robot based on instructions in a Numerical Control (NC) program;
  receiving input from a measuring device indicating end effector activity;
  detecting a pause by identifying a set of consecutive pulse signals in the input that are separated in time by an average period that is greater than a threshold; and
  updating stored data to correlate the images with instructions in the NC program, based on the detected pause.

* * * * *